United States Patent
Akman et al.

(10) Patent No.: US 11,812,376 B2
(45) Date of Patent: Nov. 7, 2023

(54) APPARATUS AND METHOD FOR QOS AWARE GTP-U TRANSPORT IN MOBILE NETWORKS

(71) Applicant: Netsia, Inc., Santa Clara, CA (US)

(72) Inventors: Arda Akman, San Ramon, CA (US); Can Altay, Istanbul (TR); Beytullah Yigit, Istanbul (TR); Burak Gorkemli, Istanbul (TR); Burcu Yargicoglu, Istanbul (TR); Oguz Oktay, Sunnyvale, CA (US); Seyhan Civanlar, Istanbul (TR)

(73) Assignee: Netsia, Inc., Santa Clara, CA (US)

( * ) Notice: Subject to any disclaimer, the term of this patent is extended or adjusted under 35 U.S.C. 154(b) by 23 days.

(21) Appl. No.: 17/532,542

(22) Filed: Nov. 22, 2021

(65) Prior Publication Data

US 2022/0086746 A1 Mar. 17, 2022

Related U.S. Application Data (63) Continuation of application No. 16/696,882, filed on Nov. 26, 2019, now Pat. No. 11,184,843.

(51) Int. Cl.
*H04W 48/18* (2009.01)
*H04W 76/12* (2018.01)
(Continued)

(52) U.S. Cl.
CPC ......... *H04W 48/18* (2013.01); *H04L 12/4633* (2013.01); *H04L 12/4641* (2013.01);
(Continued)

(58) Field of Classification Search
None
See application file for complete search history.

(56) References Cited

U.S. PATENT DOCUMENTS 10,609,710 B2 3/2020 Liu et al.
11,044,643 B2 6/2021 Centonza et al.
(Continued)

FOREIGN PATENT DOCUMENTS

CN 108282892 A 7/2018
CN 110383885 A 10/2019
(Continued)

OTHER PUBLICATIONS

"F1 application protocol (F1AP)(Release 15)," 3GPP TSG RAN NG-RAN TS 38.473, V15.5.0, Mar. 2019, 198pgs.
(Continued)

*Primary Examiner* — Hong Shao
(74) *Attorney, Agent, or Firm* — Shumaker & Sieffert, P.A.

(57) ABSTRACT

The embodiments in this invention extend distributed unit (DU), central unit (CU) and control plane of F1 (F1-C) capabilities so that differentiated DRBs of F1-U are placed on differentiated transport network components of equivalent QoS. This is achieved by a transport-aware DU and CU that can map each F1-U DRB into appropriate OSI layer 2-4 headers and can, subsequently, store such mappings. The F1-C interface is extended to distribute the layer 2-4 headers acquired from the transport network controller to the DUs and CU. A new control interface TN-C is defined between transport network controller and CU/DU. Furthermore, a trivial mapping of those embodiments is applicable for the N3 interface as well, which solves the same problem on the backhaul transport network.

22 Claims, 8 Drawing Sheets

(51) Int. Cl.
  *H04W 76/11* (2018.01)
  *H04L 12/46* (2006.01)
  *H04W 28/02* (2009.01)
  *H04W 48/06* (2009.01)
(52) U.S. Cl.
  CPC ....... *H04W 28/0268* (2013.01); *H04W 48/06* (2013.01); *H04W 76/11* (2018.02); *H04W 76/12* (2018.02)

(56) References Cited

U.S. PATENT DOCUMENTS

| 11,184,843 | B2 | 11/2021 | Akman et al. | |
|---|---|---|---|---|
| 2019/0132251 | A1 | 5/2019 | Dao et al. | |
| 2019/0182211 | A1 | 6/2019 | Yang et al. | |
| 2019/0274064 | A1* | 9/2019 | Chapman | H04W 72/52 |
| 2019/0297634 | A1 | 9/2019 | Dai et al. | |
| 2020/0374689 | A1 | 11/2020 | Shi et al. | |
| 2021/0014768 | A1* | 1/2021 | Hong | H04W 40/22 |

FOREIGN PATENT DOCUMENTS

| EP | 3780877 A1 | 2/2021 |
|---|---|---|
| WO | 2015/170214 A1 | 10/2014 |
| WO | 2015170204 A1 | 11/2015 |
| WO | 2019139524 A1 | 7/2019 |
| WO | 2019/158100 A1 | 8/2019 |
| WO | 2019192607 A1 | 10/2019 |

OTHER PUBLICATIONS

"F1 data transport (Release 15)," 3GPP TSG RAN NG-RAN TS 38.474, V.15.2.0, Sep. 2018, 8pgs.

"F1 general aspects and principles (Release 15)," 3GPP TSG RAN NG-RAN TS 38.470, V15.2.0, Jun. 2018, 12pgs.

"General Packet Radio System (GPRS) Tunnelling Protocol User Plane (GTPv1-U) (Release 15)," 3GPP TSG TS 9.281, V15.5.0, Dec. 2018, 32pgs.

"NG Application Protocol (NGAP) (Release 15)," 3GPP TSG RAN NG-RAN TS 38.413, V15.3.0, Mar. 2019, 319pgs.

NG data transport (Release 15), 3GPP TSG RAN NG-RAN TS 38.414, V15.1.0, Sep. 2018, 8pgs.

Radio Resource Control (RRC) protocol specification (Release 15), 3GPP TSG RAN TR 38.331, V15.4.0, Dec. 2018, 474 pgs.

Study on management and orchestration of network slicing for next generation network (Release 15), 3GPP TSG TR 28.801, V15.1.0, Jan. 2018, 75pgs.

System Architecture for the 5G System; Stage 2 (Release 16), 3GPP TSG TS 23.501, V16.1.0, Jun. 2019, 368pgs.

Extended European Search Report from counterpart EP Application No. 20209890.1, dated Jun. 17, 2021, 13 pp.

Partial Extended European Search Report from counterpart European Application No. 20209890.1, dated Apr. 1, 2021, 13 pp.

Prosecution History from U.S. Appl. No. 16/696,882, dated Feb. 19, 2021 through Oct. 22, 2021, 53 pp.

Response to Extended Search Report dated Jun. 17, 2021, from counterpart European Application No. 20209890.1 filed Jan. 21, 2022, 27 pp.

Communication pursuant to Article 94(3) EPC from counterpart European Application No. 20209890.1 dated Jul. 12, 2023, 7 pp.

First Office Action and Search Report, and translation thereof, from counterpart Chinese Application No. 202011355021.7 dated Jun. 21, 2023, 26 pp.

* cited by examiner

APPARATUS AND METHOD FOR QOS AWARE GTP-U TRANSPORT IN MOBILE NETWORKS

This application is a continuation of U.S. application Ser. No. 16/696,882, filed Nov. 26, 2019, the entire contents of which are incorporated herein by reference.

TECHNICAL FIELD

This disclosure generally relates to a system and method for a 5th generation (and beyond) cellular network's fronthaul and backhaul components comprising a radio access network (RAN) and a transport network such as passive optical network (PON) or SDN.

BACKGROUND

Any discussion of the prior art throughout the specification should in no way be considered as an admission that such prior art is widely known or forms part of common general knowledge in the field.

The high bitrate and coverage requirements of 5G have been achieved by decomposing the Radio Access Network (RAN) into denser deployment of Distributed Units (DUs) wherein these small units are deployed anywhere with potentially high traffic requirements and managed by a Central Unit (CU). In effect, a CU and a collection of its subtending DUs form a logical base station, gNodeB or gNB. This decomposition created the necessity for defining yet another interface between DU and CU called the 'F1 interface'. F1 has both user plane and control plane components: F1-C, also known as F1AP, supports the exchange of signaling information between CU and DU, while F1-U supports the data transmission, in the uplink and downlink directions.

The F1-C uses Streaming Control Transmission Protocol (SCTP) defined by the IETF over IP protocol, while F1-U uses UDP over IP, and the GTP-U tunneling (see TS 38.470) as in 4G networks. The F1AP defines the application layer of signaling messages over SCTP (see TS 38.473). The signaling per F1-C interface is essentially the same as the signaling between UE and eNodeB including Radio Resource Control (RRC) (see TS 38.331) and Initial Context Setup (ICS) (see TS 38.413).

Similar to the F1 interface, the backhaul network connection between CU and 5G packet core network elements supports separation of control and user plane communications. For control plane communications, each CU and the Access and Mobility Management Function (AMF) has the N2 interface, also known as NG-C or NGAP, supporting Non-access Stratum (NAS) functions. N2 uses SCTP and IP protocols (see TS 38.413). For user plane communications, each CU and User Plane Functions (UPF) of the 5G core has the N3 interface, also known as NG-U. N3 uses UDP and IP protocols (see TS 38.414).

SUMMARY

3GPP designed a sliceable 5G mobile network infrastructure to provide many logical network segments over a common single physical network (see TR 28.801). One of the primary technical challenges facing service providers is being able to deliver the wide array of network performance characteristics that future services will demand. Such performance characteristics are bandwidth, latency, packet loss, security, and reliability—all of which will greatly vary from one service to the other. Emerging applications such as remote operation of robots, massive IoT, and self-driving cars require connectivity, but with vastly different characteristics. New technologies such as virtualization, network programmability and network slicing enable logical networks that are customized to meet the quality of service (QoS) needs of each application. Each slice can be optimized according to capacity, coverage, connectivity, security and performance characteristics. Furthermore, since the slices are isolated from each other both in the control and user planes, the user experience of the network slice will be the same as if it was a physically separate network. The 5G data radio bearers (DRBs) carry information about the QoS requirements of the slice of user's data. This information is carried on the F1-C as well as the F1-U interface that carries the user's data.

Standardization efforts have gone into defining specific slices and their requirements based on application/service. For example, the user equipment (UE) can now directly specify its desired slice using a new field in the packet header called Network Slice Selection Assistance Information (NSSAI). NSSAI is a collection of at most 8 Single NSSAIs (S-NSSAI). A subfield of S-NSSAI is Slice/Service Types (SST) that is used to indicate the slice type. The standards already defined most commonly usable network slices and reserved the corresponding standardized SST values (see TS 23.501). For example, SST values of 1, 2 and 3 correspond to slice types of enhanced Mobile Broadband (eMBB), ultra-reliable and low-latency communications (uRLLC) and massive IoT (MIoT), respectively. These services reflect the most commonly planned new services. The network slice selection instance for a UE is normally triggered as part of the UE's initial registration procedure. The AMF of the core network retrieves the slices that are allowed by the user's subscription and interacts with the Network Slice Selection Function (NSSF) of the core network to select the appropriate network slice instance for that traffic on the RAN.

Although the UE's slice information and the implied QoS are carried in the Context Setup message on F1-C or N2, and indirectly within the Tunnel End Identifier (TEID) of the GTP-U tunnel carrying the DRB in the payload, the only defined mechanism is to optionally map QoS definition, i.e., the 5G QoS Identifier (5QI), of the flows to DiffSery bits of the IP headers in both F1-U and N3 (see TS 38.474 and TS 38.414). Mapping only from 5QI to DiffSery bits is inadequate to satisfy QoS requirements for two reasons; (1) slice based QoS requirements are not completely map-able as they are defined in the NSSAIs by simply setting a DiffSery bit, (2) the transport networks may prefer other QoS differentiation mechanisms at layers 2-4 besides (or instead of) setting the DiffSery bits. Particularly when the fronthaul network is a Passive Optical Network between the CU and its group of DUs, a mechanism is needed to relay the QoS information from the lower layers to the upper layers. Usually, PON is a layer-2 transport network employing Virtual LANs (VLANs) to separate out different traffic streams. However, PON may use other tunneling techniques. Therefore, to generalize, we used the term 'transport channel' to represent any type of tunnel used at layer-2. A mechanism is needed to map each DRB into proper transport channel (and its layer 2-4 header information) that satisfy the QoS requirements of each slice. More generally speaking, since each DRB is mapped into a different GTP-U tunnel, a mechanism is needed to map each GTP-U tunnel with certain QoS requirements, wherein those QoS requirements are simply translated from those of the DRB carried within the tunnel, into a transport channel with equivalent QoS capabilities. Note that 5G architecture defines a QoS flow' to be lowest granularity of data flow and identified it by a QoS Flow Id (QFI) in each packet. Each QFI is related to a 5QI, an indicator that includes a set of packet flow treatment parameters (packet loss, packet delay, reliability etc.) and well known in prior art, and a slice Id represented by NSSAI. A DRB is formed from a collection of those 'QoS flows' that have the same 5QI and NSSAI. Each DRB is then mapped into a GTP-U tunnel on the F1-U interface, meaning a tunnel may carry multiple QoS flows with the same 5QI and NSSAI.

The aforementioned mapping function may include an intelligent and stateful decision mechanism for smart mapping of radio QoS requirements to transport channels. When the transport channel resources are inadequate to satisfy the QoS requirements of the radio, the mapping function is responsible to map the QoS flows to transport channel by maximizing the QoS satisfaction depending on the priority of the flows. Moreover, it is also the responsibility of the mapping function that none of the QoS flows should exhaust all transport channel resources, which may block transmission of the low priority traffic flows. To satisfy the reliability requirements, the mapping may configure data flows to be routed through paths with less error-rate or distributed onto cloned transmissions facilities which travel through physically disjoint paths. The mapping function must have such an intelligent decision making mechanism to trace various what-if scenarios, a few of which are outlines above. The design of internal mechanism of the mapping function is not provided here as there are many possible algorithms that can be used from prior art. Artificial intelligence and machine learning are a few to name.

The aforementioned deficiency is overcome by various different embodiments of this invention through which the QoS capabilities of the transport network is communicated with the CU and DU by the transport network controller. Similarly, the CU and DU can communicate with the transport network controller demanding transport-channels with specific QoS capabilities when new slices are created. The simplest mapping embodiment is by using a different transport channel (say VLAN) for each QoS category over the F1-U or N3 interface, and by storing the VLAN-to-slice/QoS association within the DU and CU.

According to the first embodiment, the transport network controller communicates the transport network capabilities with the CU as well as all DUs. The CU and DUs perform their own mapping between the QoS capabilities of DRB types (based on 5QI and NSSAI) representing the radio-level QoS to QoS capabilities of existing transport channels representing transport-level QoS (e.g., packet loss, delay, delay variation and bandwidth). When a new DRB is mapped onto a GTP-U tunnel that is identifiable by a Tunnel ID (TEID), both CU and DU performs the proper mapping of the radio-level QoS to transport-level QoS, and identifies a specific transport channel providing that transport-level QoS. Subsequently, the association of the TEID to layer 2-4 header information of the selected transport-channel is stored in a local database. Each time a packet within the GTP-U payload (identified by its TEID at GTP header) arrives at DU (or CU), the corresponding header information is retrieved from the database, and the transport packet header is constructed. This embodiment require: (a) an interface between each of DU and CU, and the transport network controller, (b) a mapping function within the CU and each DU to map between the radio-level and transport level QoS, (c) a mapping database in the CU and each DU storing the TEID to layer 2-4 header information. Without altering the logical structure, the mapping function can be implemented physically out of DU and CU.

According to the second embodiment, the transport network controller communicates the transport network capabilities with the CU only. The CU performs the aforementioned mapping and stores the mapping table in its database. The CU then distributes the mapping table to all its subtending DUs. This embodiment require: (a) an interface between the transport network controller and the CU only, (b) a mapping function within the CU to map between the radio-level and transport-level QoS, (c) a mapping database in CU and DUs storing TEID to layer 2-4 header information, and (d) a new message type using F1-C (i.e., a new F1AP type) to communicate the mapping table from the CU and each DU. Without altering this logical structure, the mapping function can be implemented physically out of CU.

The first and second embodiments would be applicable to the N3 interface carrying QoS flows between a CU and UPF along the backhaul network that may be (i) a layer-2 network with a transport controller, or (ii) a layer-3 network with a controller, such as a Software Defined Network (SDN) with an SDN controller.

According to a third embodiment (a direct mapping from the second embodiment), assuming the backhaul network is an SDN, the SDN controller communicates the layer-3 network capabilities with the UPF. The UPF performs the mapping between the QoS level of different types of QoS flows (note that the concept of DRB is not applicable to this interface since only QoS flows are exposed within the GTP-U tunnel) and layer 3 network route capabilities, and stores a mapping table of TED to layer 2-4 header information in its database. The UPF then sends the mapping table to the CU—forming the other end of the specific N3 interface carrying QoS flows. This embodiment requires: (a) an interface between the SDN controller and the UPF only, (b) a mapping function within the UPF to map between the route QoS and flow QoS, (c) a mapping database in CU and UPF storing the TED to layer 2-4 header information, and (d) a new message type using N2 interface which is the control plane interface for N3, (i.e., a new N2AP type) to communicate the mapping table from the UPF and a CU. Without altering this logical structure, the mapping function can be implemented physically out of UPF.

Analogously, the first embodiment can be directly and trivially mapped into a fourth embodiment for the N3 interface, and therefore will not be recited here.

The aforementioned new interface of transport network controller can be used in two capacities: (a) for a unidirectional communications from the transport controller towards the mobile network component, such as the CU, DUs, and UPF, and (b) for a bidirectional communications so that the mobile network components of the fronthaul and backhaul network such as the CU, DUs and UPF can send a request for the creation of a new transport segment such as a VLAN type for a newly created slice type, or to delete an existing transport segment such as a VLAN when a specific slice type is no longer supported.

In 5G, multiple logical base stations (gNodeB) are physically decomposed into a single Central Unit (CU) and many Distributed Units (DUs), creating the need for a fronthaul transport network between the CU and its subtending DUs. A possible fronthaul transport network is a Passive Optical Network (PON) that comprises many Optical Network Terminals (ONTs), each ONT attached to a DU, and an Optical Line Terminal (OLT) attached to the CU. An intelligent transport controller controls the group of ONTs and their OLT. While F1-U, the user plane interface between DU and CU, carries data radio bearers (DRBs) with certain quality of service and slice type assignment, there is no mechanism provided in prior art to associate these upper-layer QoS requirements to the lower-layer QoS capabilities of the transport network, creating a big disconnect between the upper and lower layers on F1-U. Exactly the same problem exists for the N3 interface that is carried on another type of backhaul transport network as well. The embodiments in this invention extend the DU, CU and control plane of F1 (F1-C) capabilities to fill-in the void so that differentiated DRBs of F1-U are placed on differentiated transport network components of equivalent QoS. This is achieved by intelligent, i.e., transport-aware, DU and CU that can map each F1-U DRB into appropriate OSI layer 2-4 headers, and store them. The F1-C interface is extended to distribute the aforementioned layer 2-4 headers acquired from the transport network controller to the DUs and CU. A new control interface TN-C is defined between transport network controller and CU/DU. Furthermore, a trivial mapping of those embodiments are applicable for the N3 interface, and solves the same problem on the backhaul transport network.

In one embodiment, the present invention provides a method for mapping the radio-level Quality of Service (QoS) of each of a plurality of data flows in a mobile network to equivalent transport-level QoS of a plurality of transport channels of a transport network and selecting a transport-channel within the plurality of transport channels suitable for a General Packet Radio Services (GPRS) Tunneling Protocol User Plane (GTP-U) tunnel, the GTP-U tunnel carrying at least one data flow among the plurality of data flows, the plurality of transport channels controlled by a transport controller, the method as implemented in a first node comprising: (a) subscribing, over a first interface, with a transport controller for information regarding transport-level QoS capabilities between the first node and a second node; (b) receiving from the transport controller, in response to the request in (a), information identifying one or more transportation channels within the plurality of transport channels providing transport-level QoS capabilities between the first node and the second node; (c) based on information received in (b), mapping and storing in a mapping table QoS capabilities for each level of the radio-level QoS and each level of the transport-level QoS; (d) storing, in the mapping table, additional mapping data of at least one transport-channel within the one or more transportation channels identified in (b), the additional mapping data corresponding to a tunnel endpoint identifier (TEID) associated with the GTP-U tunnel; (e) sending the mapping table to the second node over the first interface; and wherein the first node and the second node utilize header information corresponding to the TEID before sending packets towards each other.

In another embodiment, the present invention provides a method for mapping the radio-level Quality of Service (QoS) of each of a plurality of data flows in a mobile network to equivalent transport-level QoS of a plurality of transport channels of a transport network and selecting a transport-channel within the plurality of transport channels suitable for a General Packet Radio Services (GPRS) Tunneling Protocol User Plane (GTP-U) tunnel, the GTP-U tunnel carrying at least one data flow among the plurality of data flows, the plurality of transport channels controlled by a transport controller, the method comprising: (a) a first node and a second node both subscribing, over a first and second interface, respectively, with the transport controller for transport-level QoS capabilities between the first node and the second node; (b) receiving by the first and second nodes, from the transport controller, in response to the request in (a), information identifying one or more transportation channels within the plurality of transport channels providing transport-level QoS capabilities between the first node and the second node; (c) at the first and second nodes, based on information received in (b), mapping and storing in a mapping table QoS capabilities for each level of the radio-level QoS and each level of the transport-level QoS; (d) at the first and second nodes, storing, in the mapping table, additional mapping data of at least one transport-channel within the one or more transportation channels identified in (b), the additional mapping data corresponding to a tunnel endpoint identifier (TEID) associated with the GTP-U tunnel; and wherein the first node and the second node utilize header information corresponding to the TED before sending packets towards each other.

In another embodiment, the present invention provides a system that maps a radio-level QoS to a transport-level QoS, and selects which transport-channel to use to meet the radio-level QoS requirements of data packets carried by each General Packet Radio Services (GPRS) Tunneling Protocol User Plane (GTP-U) in a mobile network, the system comprises: (a) a mapping function that maps the radio-level QoS and transport-level QoS, (b) a mapping-database storing the mapping between each GTP-U tunnel's TEID and corresponding selected layers-2, 3 and 4 header information of the transport-channel used for the specific GTP-U tunnel, and (c) a plurality of interfaces to a plurality of transport controllers to send and receive messages about transport-level QoS information of transport channels.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DETAILED DESCRIPTION

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

An electronic device (e.g., a base station, router, switch, gateway, hardware platform, controller etc.) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices include hardware, such as a set of one or more processors coupled to one or more other components—e.g., one or more non-transitory machine-readable storage media (to store code and/or data) and network connections (to transmit code and/or data using propagating signals), as well as user input/output devices (e.g., a keyboard, a touchscreen, and/or a display) in some cases. The coupling of the set of processors and other components is typically through one or more interconnects within the electronic devices (e.g., busses and possibly bridges). Thus, a non-transitory machine-readable medium of a given electronic device typically stores instructions for execution on one or more processors of that electronic device. One or more parts of an embodiment of the invention may be implemented using different combinations of software, firmware, and/or hardware.

For simplicity, only PON is described as the fronthaul network technology, wherein there may be other alternative layer-2 technology options. Furthermore, only the fronthaul network components are detailed in the following figures because the mapping from fronthaul to backhaul network components (i.e., from F1 to N3 interface) can be trivially deduced.

As used herein, a network device such as a base station, switch, router, transport controller, OLT, or ONT, is a piece of networking component, including hardware and software that communicatively interconnects with other equipment of the network (e.g., other network devices, and end systems). Furthermore, OLT and ONT provide network connectivity to other networking equipment such as switches, gateways, and routers that exhibit multiple layer networking functions (e.g., layer-3 switching, bridging, VLAN (virtual LAN) switching, layer-2 switching, Quality of Service, and/or subscriber management), and/or provide support for traffic coming from multiple application services (e.g., data, voice, and video). User Equipment (UE) is generally a mobile device such as a cellular phone, or a sensor, or another type of equipment that wirelessly connects to the mobile network. The type, ID/name, Medium Access Control (MAC) address, and Internet Protocol (IP) address identifies any physical device in the network.

There may be up to 8, 32, 64 or 128 ONTs attached to each OLT, depending on the size of OLT implementation. ONT converts optical signals transmitted via fiber to electrical signals, and vice versa. In the upstream direction, UE sends packet data via cellular signals to towards the DU, which in turn converts them into electrical signals and sends them to its attached ONT, which in turn converts them into optical signals and sends them to the upstream OLT, which in turn converts them back to electric signals and sends them to the CU.

Each ONT aggregates and grooms different types of data coming from the DU and sends them to the upstream OLT. Grooming is the process that optimizes and reorganizes the data stream so it would be delivered more efficiently. OLT supports a dynamic bandwidth allocation (DBA) algorithm (and sometimes implements more than one algorithm) that supports fair distribution of upstream fiber capacity amongst multiple ONTs to support traffic that comes in bursts from the UEs. The OLT, its attached ONTs and the optical distribution network form a Passive Optical Network (PON). There are various types of PONs known in prior art such as Gigabit PON (GPON), Ethernet PON (EPON) and ATM PON (APON) depending on the capabilities and layer-2 protocols supported. A typical PON operates at layers 1 and 2 of OSI, but may also perform some limited layer 3 functions such as IP header lookup and processing.

The data flows of UEs are carried through application layer tunnels, called GTP-U tunnels in device-to-device data plane interfaces. Note that in this description, references to "GTP-U tunnel" cover an application layer tunnel that contains general or extended format of GTP-U header carried over IP packets of a data flow of a UE. The extended header of GTP-U tunnel may include NR RAN Container for F1 interface, PDU Session Container for N3 interface, or any other extended proprietary or standardized interface specific extension without changing general GTP-U header structure (see TS 29.281). In this invention, configuration of lower layers, such as layers 2-4 of GTP-U header, is considered as programmable for GTP-U data flows. Exemplary header information for a GTP-U data flow identified by a TEID includes: for layer-2, source and destination MAC addresses and the VLAN tag, for layer-3, source and destination IP addresses, and for layer-4, TCP or UDP port numbers.

Figure 1:
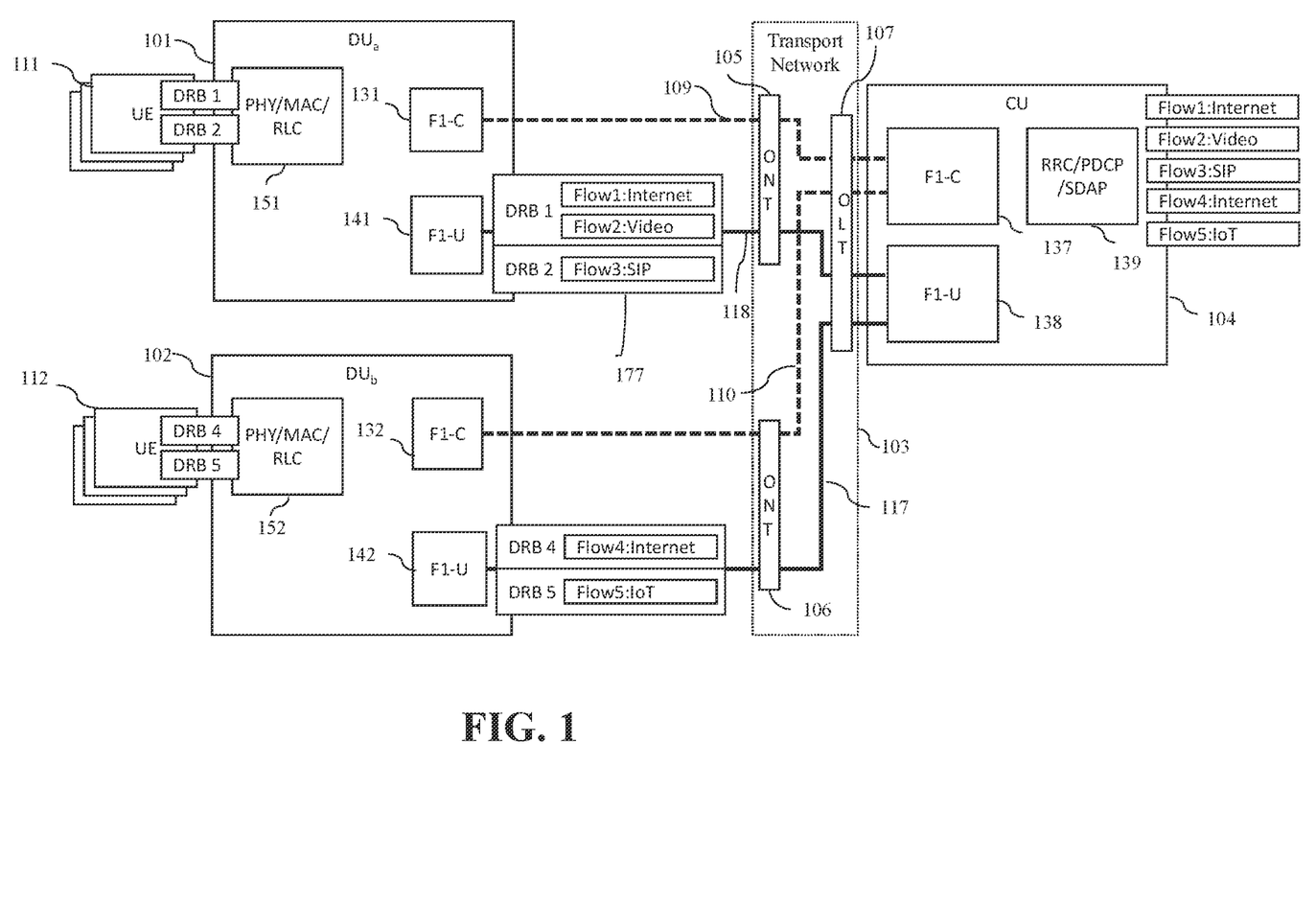
FIG. 1 illustrates the components of F1 interface according to prior art.

FIG. 1 illustrates a prior art distributed gNodeB comprised of DU 101 and DU 102 and CU 104. Both DU 101 and DU 102 have F1-C interface modules 131 and 132, respectively, to send and receive control plane messages of the F1-C interface. Similarly, both DU 101 and DU 102 have F1-U interface modules 141 and 142, respectively, to send and receive user plane messages of the F1-U interface that comprises the data radio bearers (DRBs). F1-C 131 and 132 attach to connections 109 and 110, respectively, via a transport network such as a PON. The PON performs electrical to optical conversion of signals at the DU interface, and from optical back to electrical at the CU interface. Connections 109 and 110 terminate on F1-C 137 on CU 104. Similarly, F1-U 141 and 142 attach to connections 118 and 117, respectively, via a transport network such as a PON. These connections terminate on F1-U 138 of CU 104. Note that connections 109 and 118 are attached to the same ONT 105 of transport network 103. Also, connections 110 and 117 are attached to the same ONT 106 of transport network 103. On the CU side, all optical connections terminate on OLT 107, which performs the conversion to electrical. Functions 151 and 152 in DU 101 and 102 respectively represent physical, MAC and RLC layer processing of all messages. The reciprocal function in CU 104 is function 139, which provides the Packet Data Convergence Protocol (PDCP) to upper layers, i.e., RRC for control plane, and Service Data Adaptation Protocol (SDAP) for user plane. The figure illustrates DRB 1 and DRB 2 between DU 101 and CU 104, and DRB 4 and DRB 5 between DU 102 and CU 104. DRB 1 and DRB 4 have the best effort QoS flow carrying Internet traffic. While DRB 2 has a QoS flow with a higher priority level of QoS carrying voice (Session Initiation Protocol-SIP) traffic, DRB 5 has a QoS flow with a lower priority level of QoS carrying IoT traffic.

QoS flow is a term used in 5G to represent to lowest level of granularity where policy and charging is enforced. The SDAP function maps backhaul QoS flows to DRBs. In the figure, QoS flows 1 and 2 are mapped into DRB 1 and QoS flow 3 is mapped into DRB 2. Therefore, QoS flows 1 and 2 are transmitted in the same stream of data and cannot be differentiated from each other through transport network 103. All DRBs are received in CU 104 and sent towards the core network in the form of QoS flows within GTP-U tunnels. The QoS flow to DRB mapping information is shared between CU 104 and DU 101 in the UE context setup and update procedures (see TS 38.473). When UE initially attaches to a DU, its CU sends a context setup request message, which includes DRB to QoS flow mapping, QoS flow identifiers (QFI) per flow, QoS requirements per flow and per DRB by specifying 5QI data type, and the slice information as the NSSAI. Any changes to these information elements are sent to DU by the UE's context setup modification request message. For per QoS flow or per DRB, the 5QI data type includes a large variety of service requirements including, but not restricted to, maximum delay, minimum bandwidth, maximum bandwidth, reliability, etc. In prior art, the transport network capabilities of ONT 105, 106 and OLT 107 are separately handled by the transport network, and unbeknown to DUs and CU.

Figure 2:
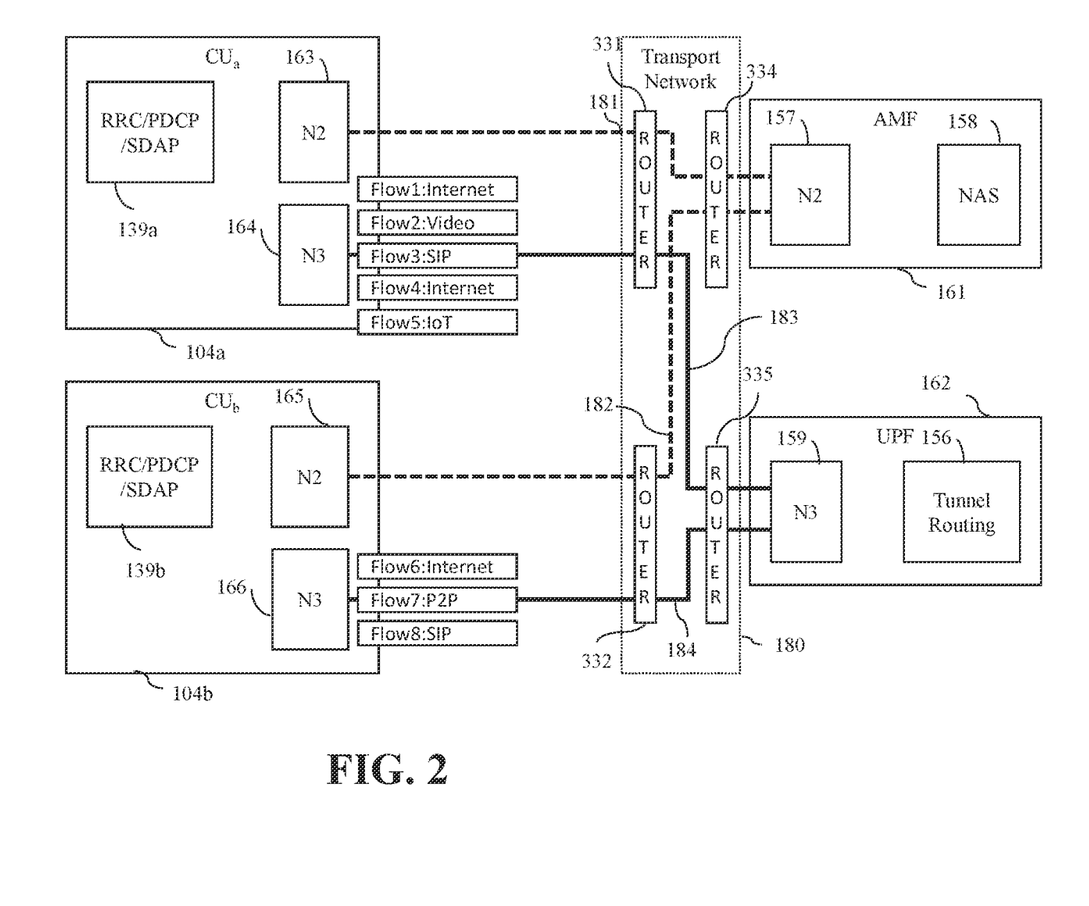
FIG. 2 illustrates the components of N2 and N3 interfaces according to prior art.

FIG. 2 illustrates a prior art configuration of two CUs, namely CUa and CUb, attached to AMF for control plane, and UPF for user plane functions. The transport network 180 between these functions is illustrated as a layer-3 network providing the routing function between each CU and a plurality of control and user plane functions distributed as virtual network functions (VNFs) across the core network. The routing provides a more flexible transport network option in this segment of the network as the control traffic can be routed to different VNFs (of the same type) depending on time of day or workload of a particular control function. In contrast, the F1 interface traffic is always between the DU and a specific CU, and thus never need to be routed elsewhere. A layer-2 network such as a PON is, therefore, most suitable for the fronthaul network. Routers 331, 332, 334 and 335 are deployed next to each function in FIG. 2, but in other embodiments a single router may connect to multiple CUs and/or multiple control and user plane functions.

CU 104*a* has N2 interface 163 and CU 104*b* has N2 interface function 165 for control plane N2 messaging with AMF 161. Similarly, CU 104*a* has N3 interface function 164 and CU 104*b* has N3 interface function 166 for user plane messaging with UPF 162. User plane traffic on interfaces 183 and 184 towards UPF162 has multiple QoS flows with different QoS characteristics. Router 331 forwards N2 traffic of CU 104*a* towards AMF 161, and N3 traffic towards UPF 162. AMF 161 controls NAS functions 105 like attach, detach, and handover, while UPF 162 controls routing between backhaul tunnels 156 and outer network. Complete functional description of AMF 161 and UPF 162 is not intended to be presented here as it is available in prior art.

Similar to F1 interface, the N3 interface can carry multiple QoS flows in a single GTP-U tunnel between UPF 162 and CUa/CUb 104*a*/104*b* (see TS 38.413). The Session Management Function (SMF) controls the establishment of N3 GTP-U tunnels (see TS 23.501). A GTP-U tunnel initialization or removal is performed during the UE context procedures. When SMF initializes a tunnel, it sends the uplink tunnel ID (TED) information to AMF. Then, AMF shares with the CU the uplink TEID, the QoS flow-to-tunnel matching information, QFIs per flow, QoS information of flows as 5QI, and slice information as NSSAI in the UE context setup request message or the UE context setup modification request message through N2 interface. When CU receives these messages, responds with the downlink TEID for the tunnel to complete the tunnel establishment procedure. In contrast to F1, the N3 interface also carries QFI in user plane, which may be used in traffic prioritization in transport network 180. However, the prior-art does not provide any coordination between the transport layer (routers 331, 332, 334, 335), and mobile network functions (CUa 104*a*, CUb 104*b*, AMF 161, UPF 162) to reflect cross-layer translation of QoS.

Note that the layer-3 transport network of FIG. 2 may comprise a Software Defined Network (SDN), wherein boxes 331, 332, 334 and 335 are not routers but switches, meaning routing decisions are taken by the controller. Furthermore, each route and its properties (such as QoS) are downloaded onto each switch in the form of instructions by the controller. Such instructions include QoS settings for specific traffic flows that are identified with VLAN tags, MPLS tags, other tunnel headers, or IP addresses and UDP/TCP port numbers. The layer-3 transport network for each slice may comprise different network facilities and different groups of UPFs allocated to that slice, and possibly controlled by a slice-specific controller.

Figure 3:
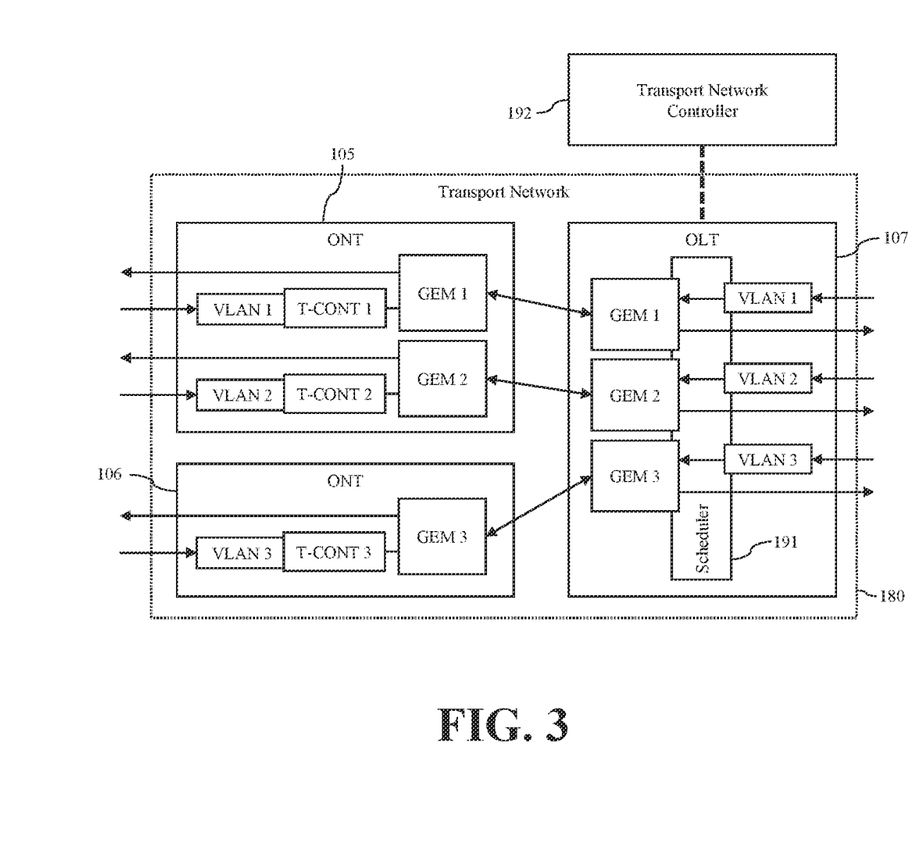
FIG. 3 depicts VLAN tags and corresponding GEM ports on a PON components according to prior art.

FIG. 3 illustrates a simple transport network with ONT 105 and 106, and OLT 107 and a transport network controller 192. ONT 105 carries two upstream VLANs, i.e., VLAN 1 and VLAN 2, and ONT 106 has upstream VLAN 3. OLT 107 has three downstream VLANs, namely VLAN 1, VLAN 2 and VLAN 3.

Traffic Container (T-CONT) is traffic bearing object within an ONT that represents a group of logical connections and is treated as a single entity for the purpose of upstream bandwidth assignment on the PON. In the upstream direction, it is used to bear the service traffic. Each T-CONT is identified by an ALLOC_ID uniquely, allocated by OLT i.e., a T-CONT can only be used by one ONT per PON interface on the OLT.

The GPON Encapsulation Method (GEM) port is a virtual port for performing so-called GEM encapsulation for transmitting frames between OLT and ONT in a GEM channel. Each different traffic class (TC) is assigned a different GEM Port ID. A T-CONT consists of one or more GEM Ports. Each GEM port usually bears one kind of service traffic corresponding a quality of service. The GEM Port ID is uniquely allocated by the OLT. Between the ONT and OLT, layer-2 frames are carried through the GEM frames identified by GEM Port IDs. Each GEM Port ID is unique per OLT and represents a specific traffic or group of flows between OLT and ONTs. GEM channels are used to transmit both upstream traffic, which is from ONT to OLT, and to transmit downstream traffic, which is always broadcast traffic from OLT towards all ONTs. Each ONT identifies traffic destined to it based on the matching GEM Port ID in the received GEM frames. In summary, GEM Ports are used to differentiate among different traffic classes (TCs). Shown in FIG.

3, GEM ports and T-CONTs are assigned to different traffic classes identified by a VLAN id or tag. Note that there are three distinct bidirectional GEM ports across ONTs and OLT corresponding to those three VLANs.

The traffic classifier in each ONT grooms traffic according to VLAN tags and sends them in upstream direction towards the corresponding GEM port. Each GEM port performs the GEM encapsulation of the VLAN traffic and forwards packets in the GEM channel towards the GEM port on OLT. The received traffic corresponding to VLAN 1, 2 and 3 are processed by different traffic classifiers (e.g., T-CONT 1, 2, and 3) and scheduled for delivery according to the traffic class priorities and upstream bandwidth assignment to that class with different queuing algorithms such as strict priority and weighted fair queuing. Such traffic classifiers and queuing algorithms are prior art. A similar process is applicable in the downstream direction wherein the roles are reversed, i.e., now both the Classification and the Scheduling is in the OLT.

The control plane of core network assigns to each user's DRB of different type a unidirectional GTP-U tunnel with a unique TEID. For example, UE 111 of FIG. 1 has two DRBs, DRB 1 and DRB 2, each using a different GTP-U tunnel between DU and CU. Each DRB contains at least one QoS flow. Each DRB has a QoS requirement definition as 5QI, while each flow also has its own 5QI definitions. Moreover, each UE has its own NSSAI, which defines service/slice type of UE 111. In NSSAI, there are at most 8 S-NSSAIs to define UE 111's slice subscription. S-NSSAI has a field known as Standard Slice Type (SST) having values of SST=1 for enhanced Mobile Broadband, eMB, SST=2 for ultra-reliable and ultra-low delay communications, uRLLC and SST=3 for Massive IoT, mIoT. To satisfy all QoS requirements defined by 5QIs and the prioritization by NSSAIs across the fronthaul and backhaul networks, these higher layer QoS definitions should be mapped to lower layer properties such as those of VLANs, which can be differentiated by ONTs, OLTs, switches, routers, etc.

There may be groups of GTP-U tunnels carrying DRBs with the same QoS requirements. Once different groups of GTP-U tunnels are identified in F1-U, with each tunnel group having a different quality of service profile, those tunnels belonging to the same group should logically be placed on the same VLAN identified by a unique VLAN tag, which VLAN providing the quality of service of the tunnel group it is carrying. Alternatively, there may be multiple VLANs providing the same transport level QoS (say on different physical links), in which case, the tunnels from the same group can be distributed across these VLANs. Although the F1-C traffic is not carried in a GTP-U tunnel, that traffic segment can be considered as a special class of the service that has a quality of service requirements such as low packet loss and placed onto a special control VLAN (say VLANc) that is allocated for F1-C traffic only.

A unique VLAN tag/id can be associated with each VLAN that has a different set of quality of service requirements within the transport network. The transport network controller can assign and maintain these tags and associated GEM ports and T-CONTs to ensure the designated quality of service is delivered on each VLAN. The VLAN tag is inserted in the upstream direction by the DU, and removed by the CU. The VLAN tags are only meaningful and visible within the fronthaul portion of the network, because they are removed before the traffic is leaving a CU towards the AMF or UPF. For simplicity, the embodiments here consider only one VLAN tag per GTP-U tunnel (or tunnel group) on F1-U, and one VLANc tag or F1-C.

Figure 4:
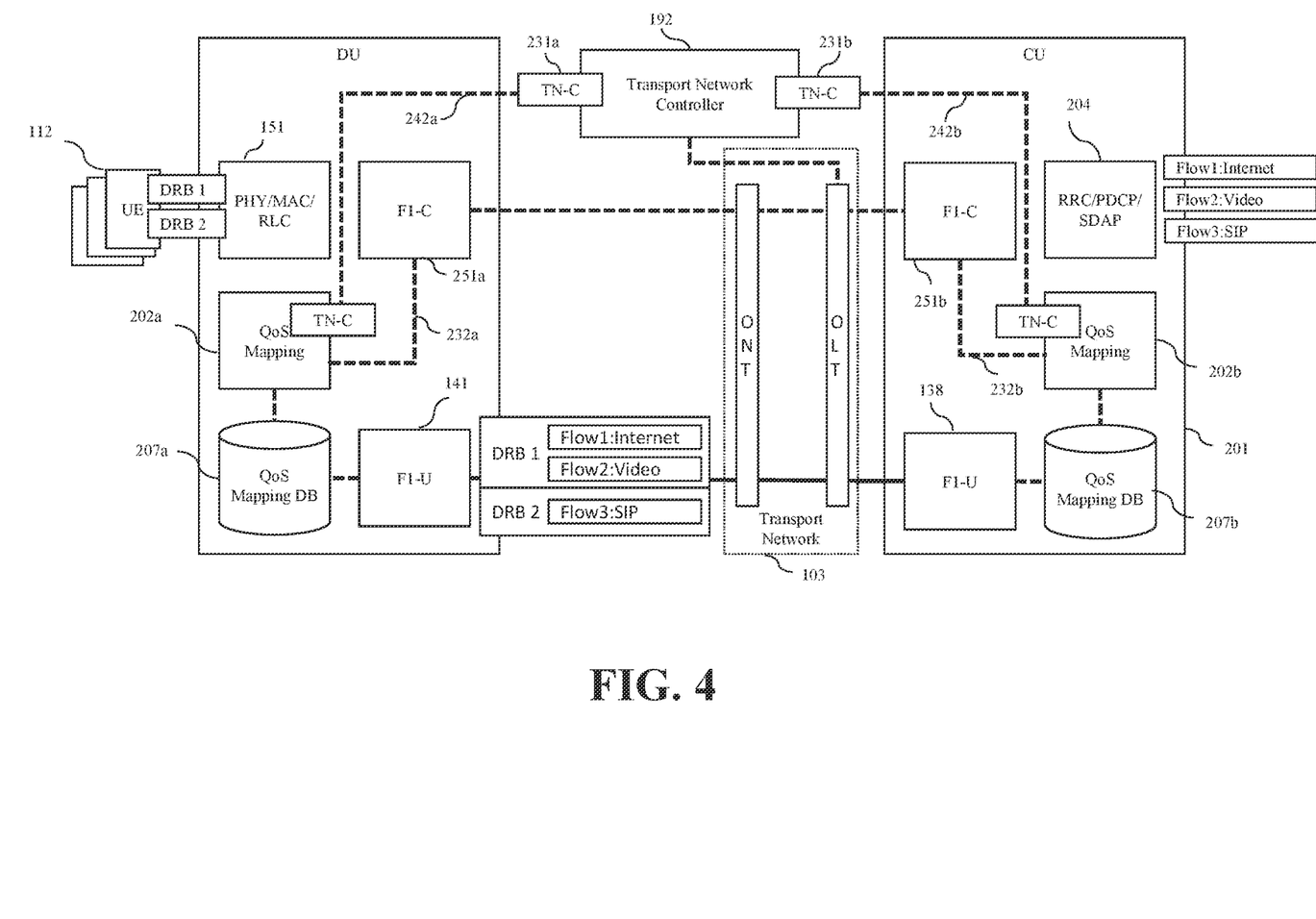
FIG. 4 illustrates the first embodiment of invention.

FIG. 4 illustrates the first embodiment of this invention. In this embodiment, transport network controller 192 has TN-C interface 231a towards DU and TN-C interface 231b towards the CU. DU has a new function called QoS mapping 202a and CU has the reciprocal function 202b. DU has a new database called QoS mapping DB 207a and CU has the reciprocal function 207b. A trivial mapping of this configuration is also applicable between the CU and UPF, wherein both CU and UPF have TN-C interfaces towards the transport network controller. Hence, it will not be recited here.

Although a single transport network controller is illustrated in FIG. 4 for simplicity, there may be multiple transport network controllers, (particularly, when each transport network controller is being associated with a specific slice) and therefore multiple TN-C interfaces at each end. The mapping between slice and TN-C interface is stored in DU, CU and UPF.

Figure 5:
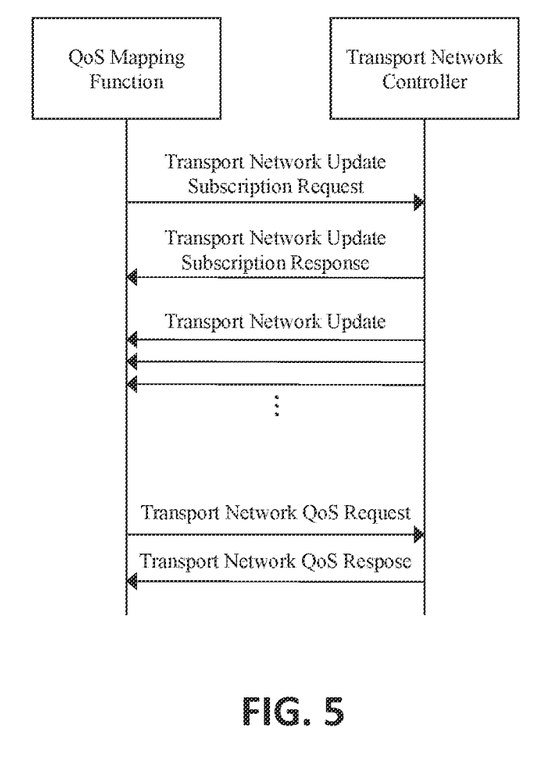
FIG. 5 illustrates exemplary TN-C interface message sequence according to invention.

The basic TN-C interface messages are illustrated in FIG. 5 and comprised of:
1. Transport Network Update Subscription Request: QoS Mapping 202 initializes connection with transport network controller 192. In this initialization message, QoS Mapping 202 subscribes to one or multiple of information objects such as:
   a. Notification for transport network topology change between DU and CU.
   b. Notification for addition or removal of VLAN tags.
   c. Notification for changes in QoS properties of a VLAN traffic.
   d. Notification of high traffic load to report congestion.
2. Transport Network Update Subscription Response: Transport network controller 192 can respond with success/failure for one or multiple subscription information objects.
3. Transport Network Update: Transport network controller 192 sends updates on subscribed information objects to QoS Mapping 202.
4. Transport Network QoS Request: QoS Mapping 202 sends a new QoS requirement to Transport network controller 192.
5. Transport Network QoS Response: Transport network controller 192 responds with success or failure.

QoS Mapping 202a maps radio-level QoS and slice requirements of each DRB type to a transport-level QoS. The mapping is stored and updated from time to time within the QoS Mapping function as a table. It updates the mappings as it received new information on topology changes that affect VLANs from the TN-C interface. Thus, this function basically determines what transport-channel to use to meet the radio-level QoS. The mapping database 207a, however, stores the specific TED to layer 2-4 header information mapping, each time a new GTP-U tunnel is formed. When the tunnel seizes to exist, the mapping is deleted from the database. Reciprocal functions are performed in the CU independently of the DU. QoS Mapping 202a can also generate requests for new VLANs from transport network controller when new types of radio-level QoS need emerge from UEs. Although we used VLANs and VLAN tags for exemplary purposes within this context, it can be some other type of transport layers 2-4.

Figure 6:
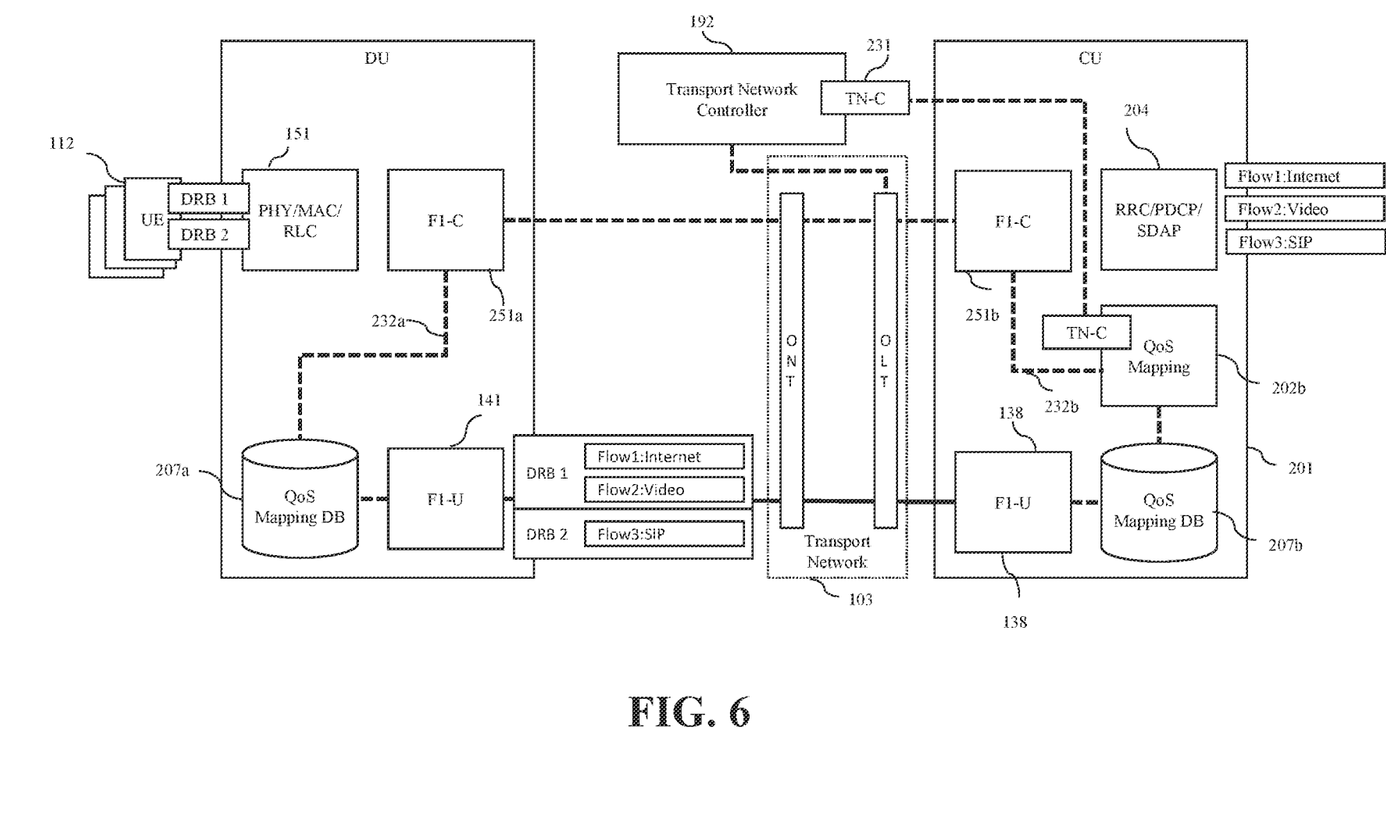
FIG. 6 illustrates the second embodiment of invention.

FIG. 6 illustrates the second embodiment of this invention. In this embodiment, transport network controller 192 has TN-C interface 231 towards the CU only. CU 201 has a new function called QoS Mapping 202b and a new database called QoS Mapping DB 207b. The basic TN-C interface messages are illustrated in FIG. 5. In contrast to the first embodiment, DU of the second embodiment does not have QoS Mapping functions, and their QoS Mapping DB 207a is updated by QoS Mapping 202b function.

For providing QoS Mapping information to DUs, the F1-C capabilities are extended by introducing a new F1AP so that the CU can disseminate the TEID to layer 2-4 header information mapping information to a subtending DU. This extension on F1 interface can be implemented by using two methods (1) embedding VLAN tag information to context setup procedure messages (as an example, the VLAN tag information can be embedded into "UP Transport Layer Information" structure defined in Section 9.3.2.1 of TS 38.473), or (2) defining two extra messages on F1 interface such as:
1. Transport Mapping Request with three operation types:
   a. Add: adds layer 2-4 header information corresponding to a TEID.
   b. Update: updates layer 2-4 header information corresponding to a TEID.
   c. Delete: deletes layer 2-4 header information corresponding to a TEID.
2. Transport Mapping Response: DU can respond with success/failure to a Transport Mapping Request.

QoS Mapping 202b has the mapping in both traffic directions. The data is stored in QoS Mapping Database 207b. QoS Mapping 202b can also generate requests for new VLANs from transport network controller when new types of DRBs emerge from UEs. QoS Mapping Database 207a is a replica of 207b. The CU communicates the information using the F1-C interface using aforementioned messages. Although we used VLANs and VLAN tags for exemplary purposes within this context, it can be some other type of transport tunneling mechanism.

Figure 7:
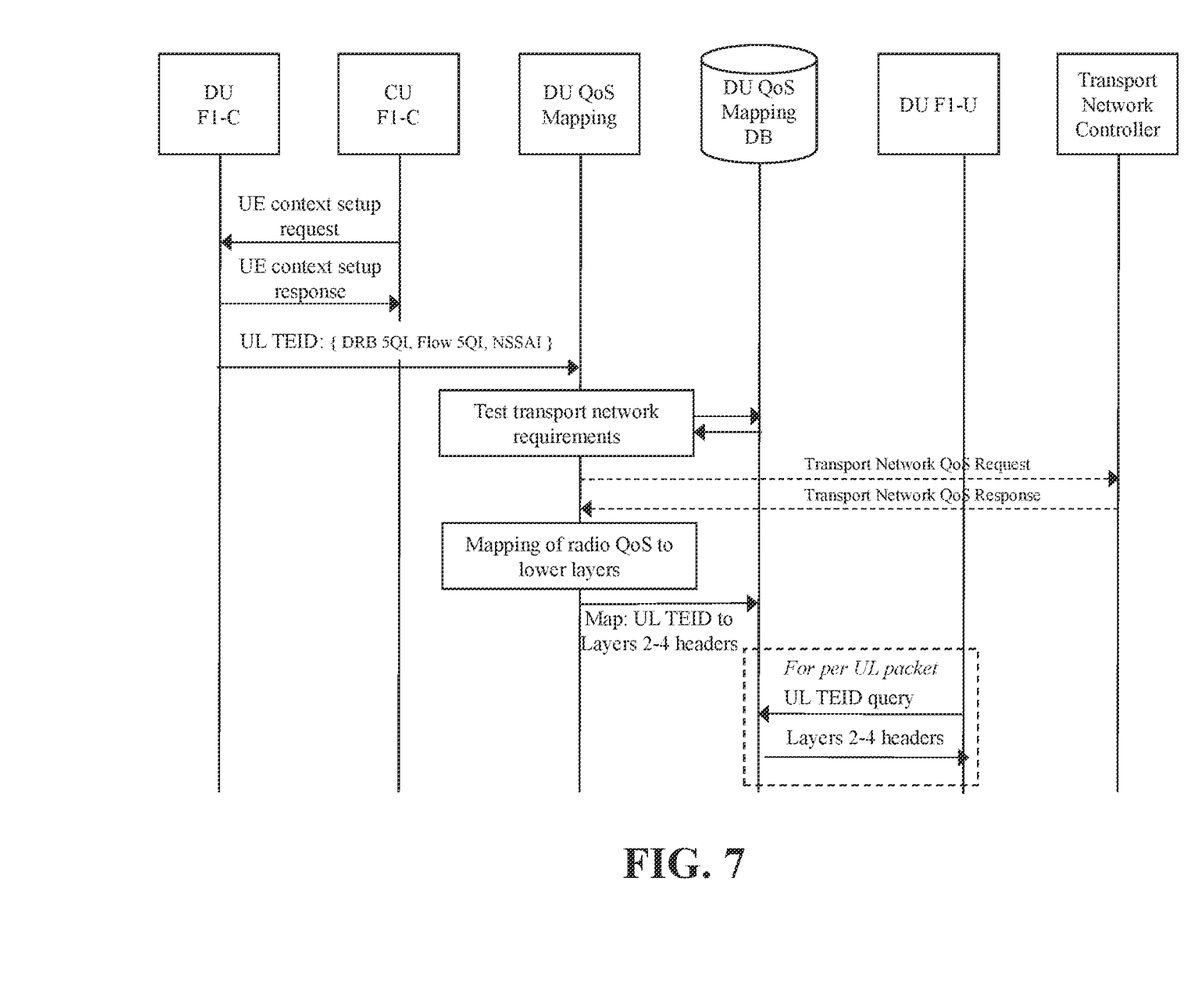
FIG. 7 depicts the messaging diagram corresponding to the first embodiment.

An exemplary message flow corresponding the first embodiment is shown in FIG. 7. The process starts with a UE context setup procedure between the DU and CU using the F1-C interface. When CU hands over to DU the Uplink (UL) TEID for the GTP-U tunnel for the specific DRB along with the associated radio-level QoS profile identified by NSSAI, flow 5QI and DRB 5QI, the DU sends this information to its QoS Mapping function. QoS Mapping first tests the achievability of new QoS requirements with the existing transport-channels' QoS capabilities. If the new QoS requirements are not achievable with QoS properties of existing VLANs, QoS Mapping function sends a Transport Network QoS Request message to the transport network controller to add a new transport network capability (such as a new VLAN tag, GEM port, TCONT, etc.) corresponding to the requested QoS profile. Depending on the success or failure in the Transport Network QoS Response, QoS Mapping generates layer 2-4 header information. The QoS Mapping constructs the layer 2-4 headers corresponding to the UL TEID and stores it in the database. Thereafter, the F1-U module queries for each packet with the UL TEID the layer 2-4 header information corresponding to the UL TEID's QoS profile, constructs the GTP-U tunnel payload and headers accordingly, and sends packet to the CU on F1-U interface. For the first embodiment, a symmetric version of message sequence in FIG. 7 is also defined for QoS Mapping of CU, 202b, for DL TEID of DRB.

Figure 8:
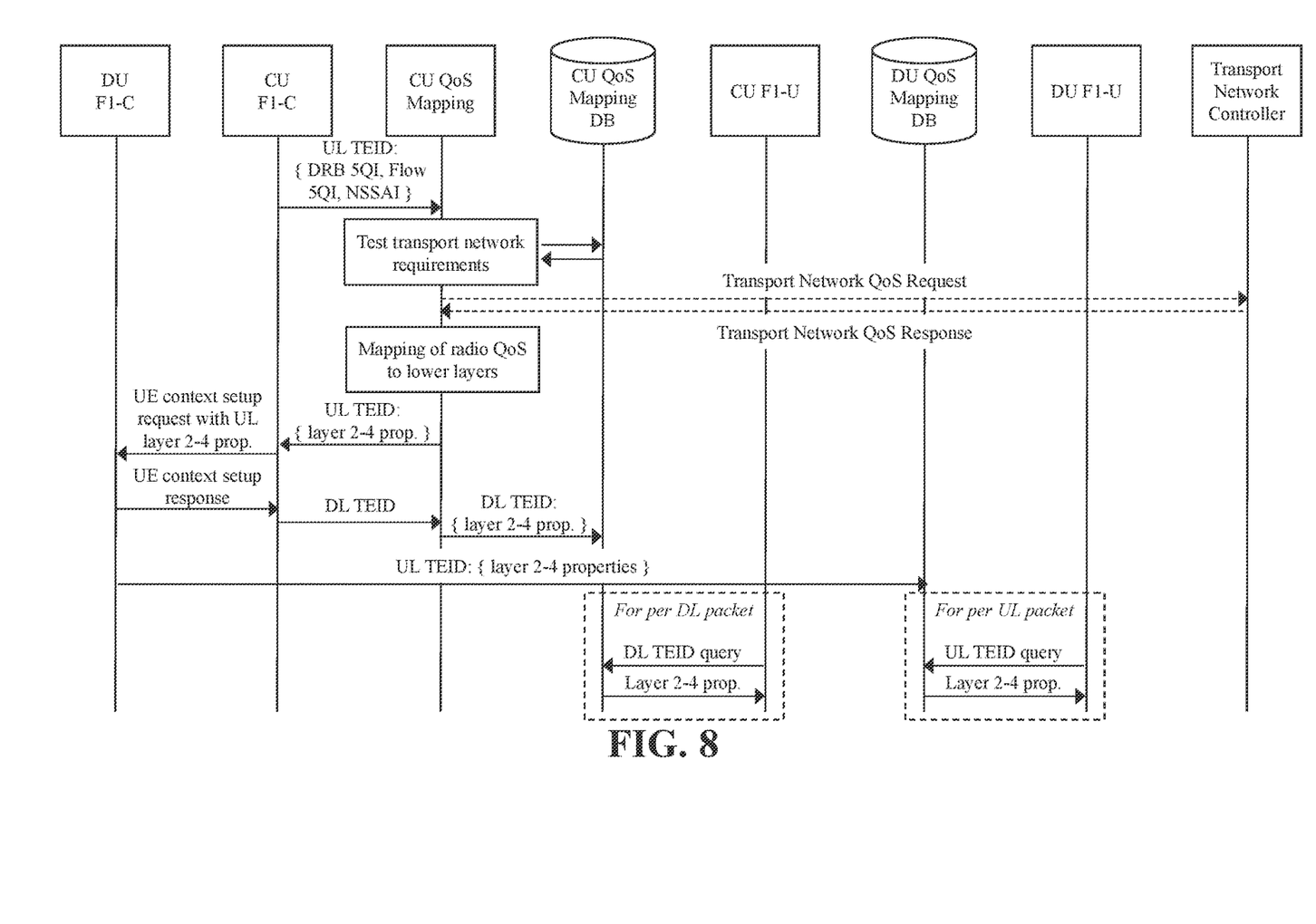
FIG. 8 depicts the messaging diagram corresponding to the second embodiment.

An exemplary message flow corresponding the second embodiment is shown in FIG. 8. The process starts before a UE context setup procedure between the DU and CU using the F1-C interface. F1-C creates UL TEID and sends it with the associated QoS profile identified by NSSAI, flow 5QIs and DRB 5QI to QoS Mapping function. QoS Mapping first tests the achievability of new QoS requirements with existing ones through available VLANs of the transport network. If the new QoS requirements are not achievable with the QoS properties of the existing VLANs, QoS Mapping function sends a Transport Network QoS Request to transport network controller to add a new transport network capability (such as a new VLAN tag, GEM port, TCONT, etc.) corresponding to the requested QoS profile. Depending on success or failure in Transport Network QoS Response, the QoS Mapping generates the layer 2-4 properties for both uplink and downlink QoS profiles of the DRB. QoS Mapping function first sends UL layer 2-4 header information with TEID to F1-C of CU for forwarding to DU. F1-C of CU sends UL layer 2-4 header information along with UL TEID either by embedding directly into the context setup messages or by using a new message type called Transport Mapping Request. When the F1-C of DU gets the UL TEID, it generates DL TEID and sends it to the CU. When the F1-C of CU gets DL TEID, it forwards it to the QoS Mapping function. The QoS Mapping function pairs generate layer 2-4 header information with DL TEID and write them into CU QoS Mapping DB. Similarly, F1-C of DU writes the received UL TEID and its layer 2-4 properties to DU QoS Mapping DB. Thereafter, the F1-U modules of both DU and CU query for TEID of each incoming packet to get the layer 2-4 properties for both uplink and downlink, and construct the GTP-U tunnel payload and headers accordingly.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

A system and method has been shown in the above embodiments for the effective implementation of an apparatus and method for QoS aware GTP-U transport in mobile networks.

What is claimed is:

1. A method comprising:
receiving, by a computing device, first information describing a transport-level Quality of Service (QoS) requirement for each of one or more transport channels of a transport network between a first node and a second node of a radio access network (RAN) of a mobile network or a core network of the mobile network;
storing, by the computing device, second information mapping a radio-level QoS requirement of a data flow in the mobile network to the transport-level QoS requirement for a first transport channel of the one or more transport channels of the transport network;
mapping, by the computing device, based on the second information, the first transport channel to the data flow; and
generating and sending, by the computing device, third information to the second node, the third information comprising data identifying the data flow and data identifying the first transport channel, the third information causing the second node to use the first transport channel when sending packets of the data flow to the first node.

2. The method of claim 1, wherein receiving the first information comprises receiving the first information from a transport network controller that manages the one or more transport channels of the transport network.

3. The method of claim 1, wherein the second information further maps slice requirements for the data flow to the transport-level QoS requirement for a first transport channel.

4. The method of claim 1, wherein the data identifying the data flow comprises data identifying a data radio bearer.

5. The method of claim 1, wherein the data identifying the data flow comprises a tunnel endpoint identifier (TEID) for a data radio bearer.

6. The method of claim 1, wherein the data identifying the first transport channel comprises at least one of layer 2, layer 3, or layer 4 header information.

7. The method of claim 1, wherein the data identifying the first transport channel identifies a virtual local area network (VLAN).

8. The method of claim 1, further comprising, by the second node:
receiving a packet of the data flow;
mapping, using the third information, a tunnel endpoint identifier (TEID), included in the packet of the data flow, to the first transport channel; and
outputting the packet of the data flow via the first transport channel.

9. The method of claim 1, further comprising, by the second node:
adding, using the third information, a virtual local area network (VLAN) tag to the packet of the data flow.

10. The method of claim 1,
wherein the first node comprises one of a Distributed Unit (DU) of the RAN or a Centralized Unit (CU) of the RAN, and
wherein the second node comprises one of the CU or the DU.

11. The method of claim 1,
wherein the first node comprises one of a User Plane Function (UPF) or a Centralized Unit (CU) of the RAN, and
wherein the second node comprises one of the CU or the DU.

12. The method of claim 1, wherein the computing device implements the first node.

13. The method of claim 1, wherein receiving the first information comprises receiving a Transport Network Update message from a transport network controller that manages the one or more transport channels of the transport network.

14. The method of claim 13, wherein the computing device sends a message to the transport network controller to subscribe to receive information regarding transport-level QoS requirement capabilities of the transport network.

15. The method of claim 1, wherein the radio-level QoS requirement is specified by one or more of a QoS flow, a Data Radio Bearer 5G QoS Identifier (DRB 5QI), or Network Slice Selection Assistance Information (NSSAI).

16. The method of claim 1,
wherein the radio-level QoS requirement comprises one or more of maximum delay, minimum bandwidth, maximum bandwidth, or reliability, and
wherein the transport-level QoS requirement comprises one or more of packet loss, delay, delay variation, or bandwidth.

17. The method of claim 1, wherein the first transport channel comprises a first Layer-2 tunnel.

18. A method comprising:
receiving, by a computing device that implements one of a Distributed Unit, Centralized Unit, or User Plane Function of a mobile network, first information describing a transport-level Quality of Service (QoS) requirement for a transport channel of a transport network between a first node and a second node of the mobile network; and
generating and sending, by the computing device and based on the first information, second information to the second node, the second information comprising data identifying a data flow and data identifying the transport channel, wherein the second information causes the second node to use the transport channel when sending packets of the data flow to the first node.

19. The method of claim 18,
wherein the data identifying a data flow comprises a tunnel endpoint identifier (TEID), and
wherein the transport channel comprises a virtual local area network (VLAN).

20. The method of claim 18, wherein the transport network comprises a Passive Optical Network.

21. A computing device comprising processing circuitry in communication with a memory, configured to:
receive first information describing a transport-level Quality of Service (QoS) requirement for each of one or more transport channels of a transport network between a first node and a second node of a radio access network (RAN) of a mobile network or a core network of the mobile network;
store second information mapping a radio-level QoS requirement of a data flow in the mobile network to the transport-level QoS requirement for a first transport channel of the one or more transport channels of the transport network;
map, based on the second information, the first transport channel to the data flow; and
generate and send third information to the second node, the third information comprising data identifying the data flow and data identifying the first transport channel, the third information causing the second node to use the first transport channel when sending packets of the data flow to the first node.

22. The computing device of claim 21,
wherein the data identifying the data flow comprises a tunnel endpoint identifier (TEID) for a data radio bearer, and
wherein the data identifying the first transport channel identifies a virtual local area network (VLAN).

* * * * *